US011343651B2

(12) United States Patent
Prasad et al.

(10) Patent No.: US 11,343,651 B2
(45) Date of Patent: May 24, 2022

(54) SYSTEM AND METHOD FOR UNLICENSED SPECTRUM TRANSMISSIONS

(71) Applicant: Nokia Technologies Oy, Espoo (FI)

(72) Inventors: Athul Prasad, Helsinki (FI); Zexian Li, Espoo (FI); Mikko Uusitalo, Helsinki (FI); Petteri Lunden, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 16/650,613

(22) PCT Filed: Oct. 12, 2017

(86) PCT No.: PCT/FI2017/050712
§ 371 (c)(1),
(2) Date: Mar. 25, 2020

(87) PCT Pub. No.: WO2019/073106
PCT Pub. Date: Apr. 18, 2019

(65) Prior Publication Data
US 2020/0228933 A1     Jul. 16, 2020

(51) Int. Cl.
H04W 4/06         (2009.01)
H04W 16/02        (2009.01)
(Continued)

(52) U.S. Cl.
CPC ............. H04W 4/06 (2013.01); H04W 16/02 (2013.01); H04W 16/14 (2013.01); H04W 28/16 (2013.01);
(Continued)

(58) Field of Classification Search
CPC ....... H04W 4/06; H04W 16/02; H04W 16/14; H04W 28/16; H04W 72/005;
(Continued)

(56) References Cited

U.S. PATENT DOCUMENTS 9,398,563 B2   7/2016   Zhang et al.
9,717,087 B2   7/2017   Zhang et al.
(Continued)

OTHER PUBLICATIONS

Agyapong, Patrick Kwadwo, et al. "Design considerations for a 5G network architecture." IEEE Communications Magazine 52.11 (2014): 65-75. (Year: 2014).*

(Continued)

Primary Examiner — Sharad Rampuria
(74) Attorney, Agent, or Firm — Squire Patton Boggs (US) LLP

(57) ABSTRACT

A system comprising: a plurality of base stations forming a multicast broadcast single frequency network operating using unlicensed frequency resources; and a network element configured to allocate a transmission period to each of the plurality of base stations, wherein each base station is configured to independently determine whether the unlicensed frequency resources are available for transmission, and transmit a data packet using the unlicensed frequency resources during the allocated transmission period only if the unlicensed frequency resources are determined to be available.

20 Claims, 7 Drawing Sheets

(51) Int. Cl.
  *H04W 16/14* (2009.01)
  *H04W 28/16* (2009.01)
  *H04W 72/00* (2009.01)
  *H04W 74/08* (2009.01)
(52) U.S. Cl.
  CPC ..... *H04W 72/005* (2013.01); *H04W 74/0808* (2013.01)
(58) Field of Classification Search
  CPC . H04W 74/0808; H04W 72/04; H04W 72/12; H04W 76/00; H04B 7/2121; H04B 7/2123; H04J 2203/0069; H04Q 2213/394
  See application file for complete search history.

(56) References Cited

U.S. PATENT DOCUMENTS

| | | | |
|---|---|---|---|
| 2008/0025240 | A1 | 1/2008 | Casaccia et al. |
| 2013/0208587 | A1 | 8/2013 | Bala et al. |
| 2015/0055541 | A1* | 2/2015 | Zhang ................ H04W 72/005 370/312 |
| 2015/0131516 | A1 | 5/2015 | Zhang |
| 2015/0146680 | A1 | 5/2015 | Luo et al. |
| 2015/0180676 | A1 | 6/2015 | Bao et al. |
| 2015/0289293 | A1 | 10/2015 | Zhang et al. |
| 2017/0034670 | A1 | 2/2017 | Zhang et al. |
| 2021/0219341 | A1* | 7/2021 | Jia .................... H04W 72/0446 |

OTHER PUBLICATIONS

Wang, Pengfei, et al. "Cellular V2X communications in unlicensed spectrum: Harmonious coexistence with VANET in 5G systems." IEEE Transactions on Wireless Communications 17.8 (2018): 5212-5224. (Year: 2018).*

Office action received for corresponding European Patent Application No. 17792107.9, dated Aug. 3, 2021, 11 pages.
Prasad et al., "Enabling Group Communication for Public Safety in LTE-Advanced Networks", Journal of Network and Computer Applications, vol. 62, Feb. 2016, pp. 41-52.
Liu et al., "Enhanced Listen-Before-Talk Mechanism for Licensed Assisted Access in Unlicensed Spectrum", IEEE Wireless Communications and Networking Conference, Apr. 3-6, 2016, 6 pages.
Wang et al., "LTE MBMS SYNC Protocol for Support Synchronisation of Content", IEEE International Conference on Communications Technology and Applications, Oct. 16-18, 2009, pp. 392-395.
"LTE; Evolved Universal Terrestrial Radio Access (E-UTRA) and Evolved Universal Terrestrial Radio Access Network (E-UTRAN); Overall description; Stage 2 (3GPP TS 36.300 version 13.5.0 Release 13)", ETSI TS 136 300, V13.5.0 , Dec. 2016, pp. 1-327.
"3rd Generation Partnership Project; Technical Specification Group Radio Access Network; Evolved Universal Terrestrial Radio Access Network (E-UTRAN); M1 data transport (Release 14)", 3GPP TS 36.445, V14.0.0, Mar. 2017, pp. 1-8.
"3rd Generation Partnership Project; Technical Specification Group Radio Access Network; Evolved Universal Terrestrial Radio Access Network (E-UTRAN); M2 Application Protocol (M2AP) (Release 14)", 3GPP TS 36.443, V14.0.1, Apr. 2017, pp. 1-95.
"3rd Generation Partnership Project; Technical Specification Group Radio Access Network; Evolved Universal Terrestrial Radio Access Network (E-UTRAN); M3 Application Protocol (M3AP) (Release 14)", 3GPP TS 36.444, V14.1.0, Jun. 2017, pp. 1-66.
"3rd Generation Partnership Project; Technical Specification Group Services and System Aspects; Multimedia Broadcast/Multicast Service (MBMS); Architecture and functional description (Release 14)", 3GPP TS 23.246, V14.2.0, Sep. 2017, pp. 1-76.
International Search Report and Written Opinion received for corresponding Patent Cooperation Treaty Application No. PCT/FI2017/050712, dated Jun. 19, 2018, 15 pages.

\* cited by examiner

SYSTEM AND METHOD FOR UNLICENSED SPECTRUM TRANSMISSIONS

RELATED APPLICATION

This application claims priority to PCT Application No. PCT/FI2017/050712, filed on Oct. 12, 2017 of which is incorporated herein by reference in its entirety.

TECHNICAL FIELD

The present disclosure relates to a system and associated method which enable data to be transmitted over a multicast broadcast single frequency network using unlicensed frequency resources whilst complying with contention-based protocols defined by the transmission standards. In some examples, the system comprises a plurality of base stations forming the multicast broadcast single frequency network, and a network element configured to allocate a transmission period to each of the plurality of base stations. In these examples, each base station is configured to independently determine whether the unlicensed frequency resources are available for transmission, and transmit a data packet using the unlicensed frequency resources during the allocated transmission period only if the unlicensed frequency resources are determined to be available.

BACKGROUND

Research is currently being done to develop Fifth Generation (5G) wireless networks.

The listing or discussion of a prior-published document or any background in this specification should not necessarily be taken as an acknowledgement that the document or background is part of the state of the art or is common general knowledge.

SUMMARY

According to a first aspect, there is provided a system comprising:
 a plurality of base stations forming a multicast broadcast single frequency network operating using unlicensed frequency resources; and
 a network element configured to allocate a transmission period to each of the plurality of base stations,
 wherein each base station is configured to independently determine whether the unlicensed frequency resources are available for transmission, and transmit a data packet using the unlicensed frequency resources during the allocated transmission period only if the unlicensed frequency resources are determined to be available.

Each base station may be configured to discard the data packet if the unlicensed frequency resources are determined by the base station to be unavailable for transmission.

Each base station may be configured to delay transmission of the data packet until the unlicensed frequency resources become available if the unlicensed frequency resources are determined by the base station to be unavailable for transmission.

The network element may be configured to allocate a plurality of sequential transmission periods to each of the plurality of base stations, and the base station may be configured to delay transmission of the data packet until the next allocated transmission period at which the unlicensed frequency resources are available.

Each base station may be configured to inform the network element about the unavailability of the unlicensed frequency resources if the unlicensed frequency resources are determined by the base station to be unavailable for transmission.

The network element may be configured to allocate a sub-period of the allocated transmission period for the base station to determine whether the unlicensed frequency resources have become available, and the base station may be configured to transmit the data packet using the unlicensed frequency resources before expiry of the allocated transmission period if it is determined that the unlicensed frequency resources have become available.

The network element may be configured to determine whether one or more of the transmission coverage and transmission capacity of the single frequency network without the base station has decreased below a predefined threshold, and adapt the transmission parameters of at least one of the other base stations to compensate for the decrease in transmission coverage and/or transmission capacity.

If the unlicensed frequency resources are determined by more than a predefined number of base stations to be unavailable for transmission, the network element may be configured to allocate an alternative transmission period to at least those base stations.

The network element may be configured to initially allocate a plurality of sequential transmission periods to each of the plurality of base stations, and the alternative transmission period may occur earlier than the next transmission period initially allocated.

Any base stations that have already transmitted the data packet may be configured to retransmit the data packet during the alternative transmission period.

Each base station may be configured to independently determine, during a sensing period, whether the unlicensed frequency resources are available for transmission.

The sensing period may be any time other than an allocated transmission period.

The network element may be configured to allocate a plurality of sequential transmission periods to each of the plurality of base stations, and the sensing period may begin after a predefined delay following expiry of an allocated transmission period.

The network element may be configured to allocate a plurality of sequential transmission periods and a plurality of sequential sensing periods to each of the plurality of base stations.

The plurality of transmission and sensing periods may be allocated according to a predefined pattern.

One or more of the plurality of transmission periods and the plurality of sensing periods may be equally spaced from one another.

The plurality of transmission and sensing periods may be allocated using time stamp marking in a plurality of respective data packets.

The plurality of transmission and sensing periods may be allocated using extensions in the SYNC or IP protocol.

The plurality of transmission and sensing periods may be allocated using header extensions (e.g. General Packet Radio Service Tunnelling Protocol (GTP) using plane packet headers, 5G Quality of Service Flow Identity extensions, etc).

The plurality of transmission periods may be allocated using first frame types which contain payload information, and the plurality of sensing periods may be allocated using second frame types which do not contain payload information.

The plurality of sensing periods may be allocated using the frame type 0.

The plurality of sensing periods may be allocated using null protocol data units for type 1/2.

The plurality of transmission and sensing periods may be allocated using specific information contained in extended packet headers.

One or more of the plurality of transmission periods and the plurality of sensing periods may be allocated using spare bits within the SYNC protocol data units.

One or more of the plurality of transmission periods and the plurality of sensing periods may be allocated using spare bits within the currently defined 4G/LTE or 5G protocol data units.

The network element may comprise one or more of a broadcast multicast service centre, a multicast coordination entity and one of the base stations.

The allocated transmission and sensing periods may be defined in terms of time and/or frames.

The system may further comprise a user device configured to receive the transmitted data packets from the base stations.

The user device may be configured to measure the transmitting power of a transmitter which does not form part of the single frequency network, and inform one or more of the network element and a base station of the single frequency network about the transmitter.

The user device may be configured to inform one or more of the network element and base station about the transmitter only if the transmitting power of the transmitter exceeds a predefined threshold.

The user device may be configured to measure the transmitting power of the transmitter only during the allocated transmission period of the base stations.

The plurality of base stations may be configured to exchange information about the unavailability of the unlicensed frequency resources with one another.

Each base station may be configured to transmit the data packet using an alternative transmission mode if the unlicensed frequency resources are determined by the base station to be unavailable for transmission.

The system may form part of a 3G, 4G or 5G network.

The single frequency network may be a vertical micro-operator network (e.g. tailored for specific local services and use cases).

The data packet may comprise payload data provided by the micro-operator network.

The payload data may comprise advertising data.

The unlicensed frequency resources may comprise one or more of an unlicensed frequency channel, band and time/frequency block.

Each base station may be a small cell base station, such as a microcell, picocell or femtocell base station, or any type of base station conforming to regulatory requirements related to maximum allowable transmit power on the used frequency band.

According to a further aspect, there is provided a method comprising:
  allocating, by a network element, a transmission period to each of a plurality of base stations forming a multicast broadcast single frequency network operating using unlicensed frequency resources;
  independently determining, by each base station, whether the unlicensed frequency resources are available for transmission; and
  transmitting, by each base station, a data packet using the unlicensed frequency resources during the allocated transmission period only if the unlicensed frequency resources are determined to be available.

According to a further aspect, there is provided a base station forming part of a multicast broadcast single frequency network operating using unlicensed frequency resources, the base station configured to:
  receive a transmission period allocated by a network element;
  determine whether the unlicensed frequency resources are available for transmission; and
  transmit a data packet using the unlicensed frequency resources during the allocated transmission period only if the unlicensed frequency resources are determined to be available.

According to a further aspect, there is provided a method of using a base station forming part of a multicast broadcast single frequency network operating using unlicensed frequency resources, the method comprising:
  receiving a transmission period allocated by a network element;
  determining whether the unlicensed frequency resources are available for transmission; and
  transmitting a data packet using unlicensed frequency resources during the allocated transmission period only if the unlicensed frequency resources are determined to be available.

According to a further aspect, there is provided a network element forming part of any system described herein.

According to a further aspect, there is provided a base station forming part of any system described herein.

According to a further aspect, there is provided a user device forming part of any system described herein.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described example embodiments.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable medium, which may be a physical computer readable medium such as a disc or a memory device, or may be embodied as a transient signal. Such a transient signal may be a network download, including an internet download.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

Multicast and broadcast networks coming under the umbrella of Multimedia Broadcast Multicast Service (MBMS) has been a key component in Third Generation (3G) and Fourth Generation (4G) LTE-Advanced wireless networks in enabling resource efficient content distribution. The content has mainly been TV broadcast and public safety (public warning systems and mission critical communication systems) in legacy broadband networks. Using adapted architecture, content delivery for vehicle-to-everything (V2X) type services are also enabled. Due to the improvement in the content quality requirements and time criticality, the amount of radio resources consumed for delivering the content has been increasing with the passage of time. The content quality requirements have been constantly increasing with advanced video and audio codecs enhancing the quality of experience of the end users, and the network operators need to allocate greater radio resources to efficiently and effectively deliver this content to the end user. The scarce amount of available spectral resources makes such content delivery over the air increasingly challenging, especially when the media is broadcast over a wide area.

Figure 1:
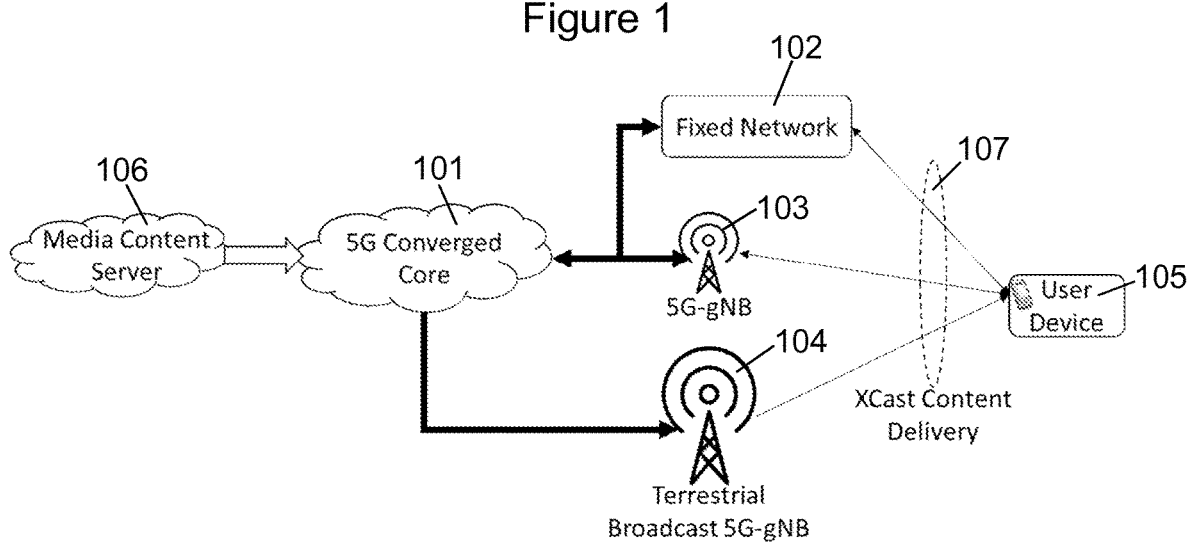
FIG. 1 shows an example of a 5G wireless network.

FIG. 1 shows an example of a 5G wireless network. With longer cyclic prefix lengths standardized in Release-14 of the Third Generation Partnership Project (3GPP), having wider coverage areas for delivering multicast broadcast traffic using mobile networks is currently possible, especially using high-power, high-tower types of deployments. The adoption of mobile network standards for multicast broadcast content delivery is expected to continue in 5G New Radio (NR) as well, with new enhancements providing higher spectral efficiency and capacity. One of the key research objectives in 5G is to develop a converged network 101 that can efficiently interwork with the fixed 102, mobile 103 and terrestrial 104 networks to deliver the best user experience to the end users 105.

The 5G wireless network of FIG. 1 enables the content providers 106 to maximize the reachability of the content. One important feature of this network is incorporation of the explicit multi-unicast (XCast) transmission scheme 107 (an efficient combination of Uni-, Multi- or Broad-Cast) for the delivery of content to the user device 105. Another important feature (not shown) is the use of a multicast broadcast single frequency network (MBSFN) whereby multiple synchronized base stations send the same multicast broadcast content using the same radio parameters, which is then combined in the user device 105 to enhance the received signal quality.

Figure 2:
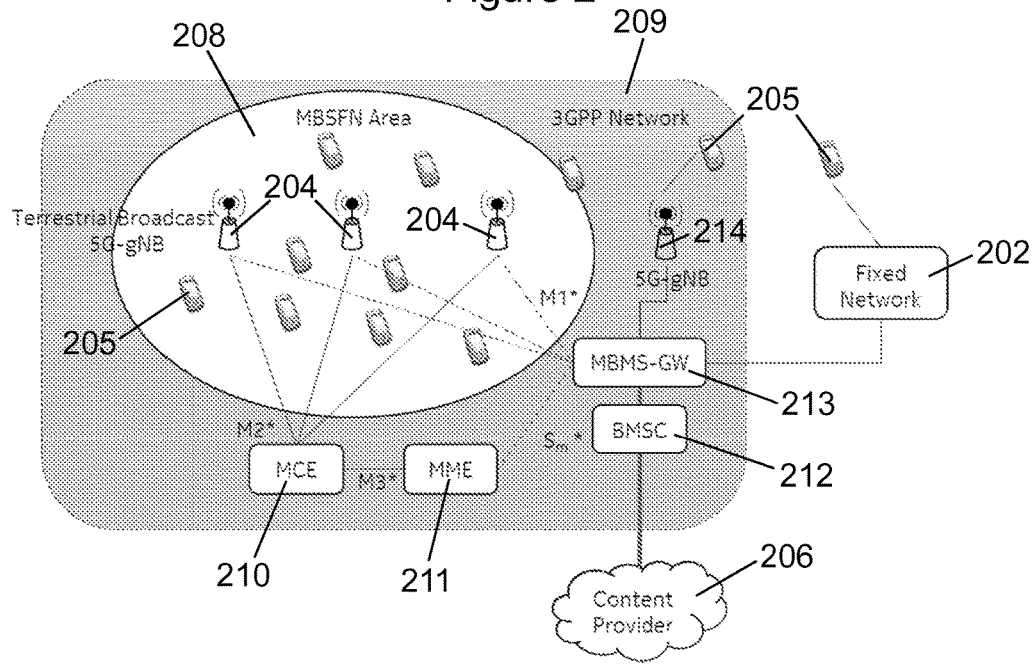
FIG. 2 shows an example of a 5G wireless network comprising a multicast broadcast single frequency network.

FIG. 2 shows an example of a 5G wireless network comprising a MBSFN 208 comprising a plurality of terrestrial base stations 204 for delivering content to a plurality of user devices 205. The 5G network also comprises a 3GPP network 209, a content provider 206 and a fixed network 202. Here we assume that within the 3GPP network 209, content is delivered using XCast and unicast in fixed networks possibly using IP multicast packets. The final leg for the fixed networks could also be using wireless access technologies such as WiFi™, and the user device 205 with the multi-radio support can efficiently receive content seamlessly using multiple interfaces. The 3GPP network 209 comprises standard network elements such as a Multicast Coordination Entity (MCE) 210, a Mobility Management Entity (MME) 211, a Broadcast Multicast Service Centre (BMSC) 212, a Multimedia Broadcast Multicast Service Gateway (MBMS-GW) 213 and a terrestrial base station 214.

The various control interfaces of the 3GPP network are also indicated in FIG. 2. M1* is the interface between the MBMS-GW 213 and the base stations 204, M2* is the interface between the MCE 210 and the base stations 204, M3* is the interface between the MCE 210 and the MME 211, and $S_m$* is the interface between the MME 211 and the MBMS-GW 213. These interfaces are generally as defined in the 3GPP specifications, but may have different/enhanced properties for 5G.

Current considerations related to system design and architecture has been mainly related to traditional wide-area macro network deployments for media delivery. However, vertical micro-operator (µO) networks that can be deployed with minimal interworking with the wide-area macro-operator network are also considered to be important in 5G. One advantage of µO networks is the ability to tailor the network to specific use cases, thereby enhancing the quality of service and experience for the end users.

There are a significant number of use cases for which such solutions would be relevant. One example is virtual reality (VR) theatre. VR may be the next disruptor in the field of mass media and entertainment. The wide adoption of such a technology requires cost-efficient and robust provisioning of services to the end consumers. This also creates an ideal opportunity for both movie producers and theatre owners to generate additional revenues, while providing an enhanced viewing experience to the movie viewers. 5G technology in itself has all the essential ingredients for providing such services over the air for the consumers, especially in home/public theatres or viewing arenas. Since there can be several hundred viewers in a theatre viewing the same content simultaneously, providing such content wirelessly using unicast is not a realistic option, and it thus requires a multicast broadcast type of content delivery.

Similar applications are envisioned for education by which students could have an enhanced learning experience through viewing VR content. Augmented reality is yet another use case for multimedia broadcast in a limited environment for a large number of users. Such applications could be especially relevant in sports events to enhance the viewing experience of the viewers in the stadium.

Each of these use cases require an efficient mix of the key 5G performance indicators, such as extreme mobile broadband, ultra-reliability and low-latency in order to provide the best experience to the end users. A key issue, however, is the setting up of a MBSFN in an unlicensed frequency band, solutions for which do not currently exist. The main reason behind this has been the consideration of unicast service provisioning over unlicensed bands. One challenge in operating a MBSFN on the unlicensed spectrum is the contention-based protocols required by the regulations, such as the listen-before-talk (LBT) mode of operation.

Figure 3:
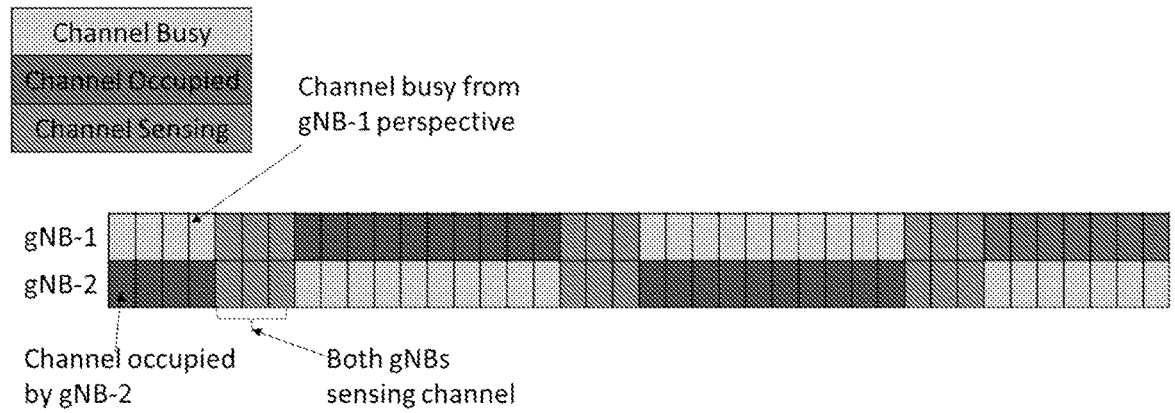
FIG. 3 shows the listen-before-talk operation of first and second base stations.

FIG. 3 shows the LBT operation of first (gNB-1) and second (gnB-2) gigabit NodeB base stations. Here each base station senses the channel and initiates transmissions once the channel is sensed to be free. If the channel is sensed to be busy, the base station waits until the next transmission opportunity to initiate data transmissions.

As a result of these protocols, access to the medium cannot be guaranteed at any specific moment. Furthermore, even the other transmitters of the same network are considered as someone using the channel and may thus block transmission. Possible options for addressing such limitations would be to setup a distributed antenna system, or using coordinated multipoint techniques such as Coordinated Multi-Point (CoMP) for joint transmission or coordinated scheduling. However, these options have a significant cost associated in terms of backhaul requirements, which makes them unsuitable for 5G deployments, especially in the context of µO networks.

The above-mentioned issues make it non-trivial to implement a MBSFN on the unlicensed spectrum. There will now be described a system and method which may address this problem.

Figure 4:
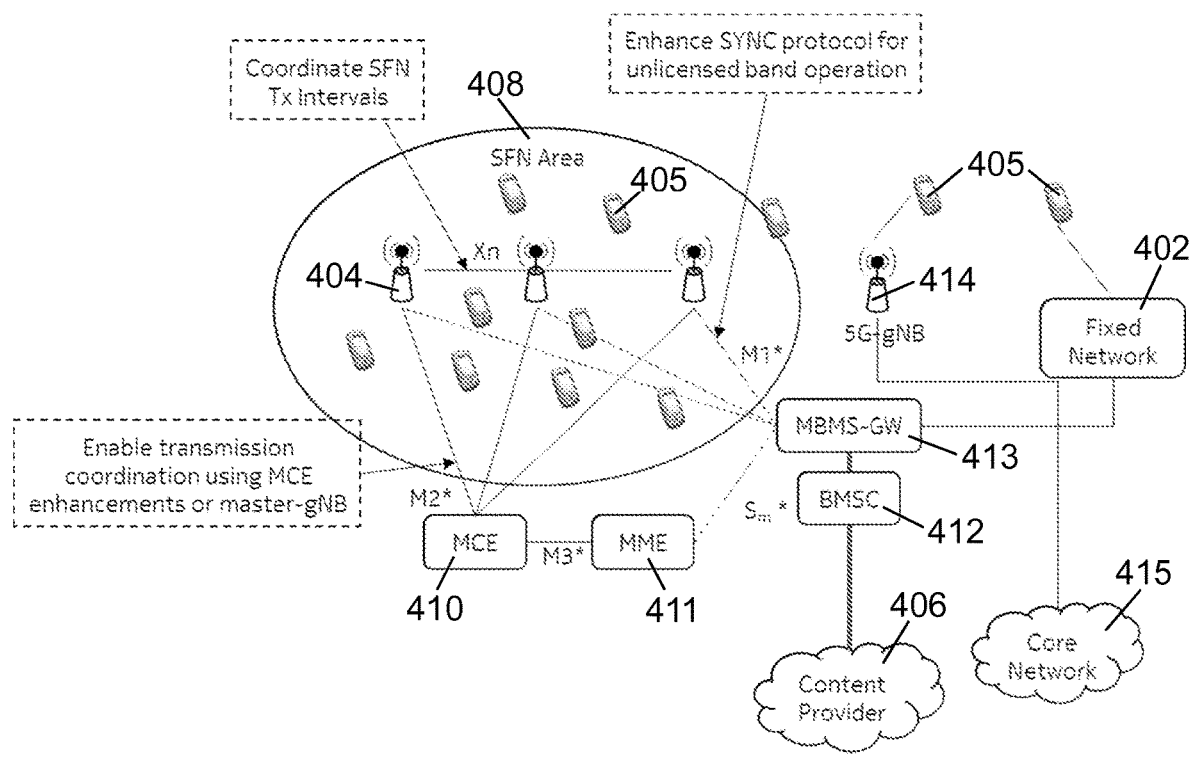
FIG. 4 shows another example of a 5G wireless network comprising a multicast broadcast single frequency network.

FIG. 4 shows an example of a 5G wireless network comprising the present system (although the present system could form part of a 3G or 4G network). The system comprises a plurality of base stations 404 forming a MBSFN 408 operating using unlicensed frequency resources, and a network element 410, 412 configured to allocate a (common) transmission period to each of the plurality of base stations 404. The base stations 404 may be small cell base stations such as microcell (range of ≤2 km), picocell (range of ≥200 m) or femtocell (range of ≥10 m) base stations, and may be spatially distributed to provide a substantially complete transmission coverage over the area of the MBSFN 408. The MBSFN 408 may be a vertical µO network configured to transmit multicast broadcast content provided by the µO. For example, the µO network may be deployed within a shopping centre to transmit advertising as payload data within one or more data packets to users located within the shopping centre. The MBSFN 408 of base stations 404 and the network element 410, 412 may be jointly or independently owned/operated. In addition, the network element 410, 412 may comprise one or more of a broadcast multicast service centre (BMSC) 412, a multicast coordination entity (MCE) 410 and one of the base stations 404 (e.g. a master base station), and the unlicensed frequency resources may comprise one or more of an unlicensed frequency channel, band and time/frequency block.

The 5G network of FIG. 4 also comprises a MME 411, a MBMS-GW 413, a content provider 406, a core network 415, a fixed network 402 and a terrestrial base station 414 to help deliver content to a plurality of user devices 405.

Once each base station 404 has received the transmission period allocated by the network element 410, 412, they are configured to independently determine whether the unlicensed frequency resources are available for transmission, and transmit one or more (common) data packets using the unlicensed frequency resources during the allocated transmission period only if the unlicensed frequency resources are determined to be available. In this respect, determining the availability of the unlicensed frequency resources may comprise scanning for any transmitters not forming part of the MBSFN 408 which are currently transmitting using the same unlicensed frequency resources as the MBSFN 408, and concluding that the unlicensed frequency resources are available if no such transmitters are detected.

The network element 410, 412 therefore coordinates transmissions by the plurality of base stations 404 of the MBSFN 408. This relatively simple and cost-efficient approach enables multicast broadcast content to be transmitted using the MBSFN 408 whilst ensuring that any contention-based protocols are adhered to.

Figure 5:
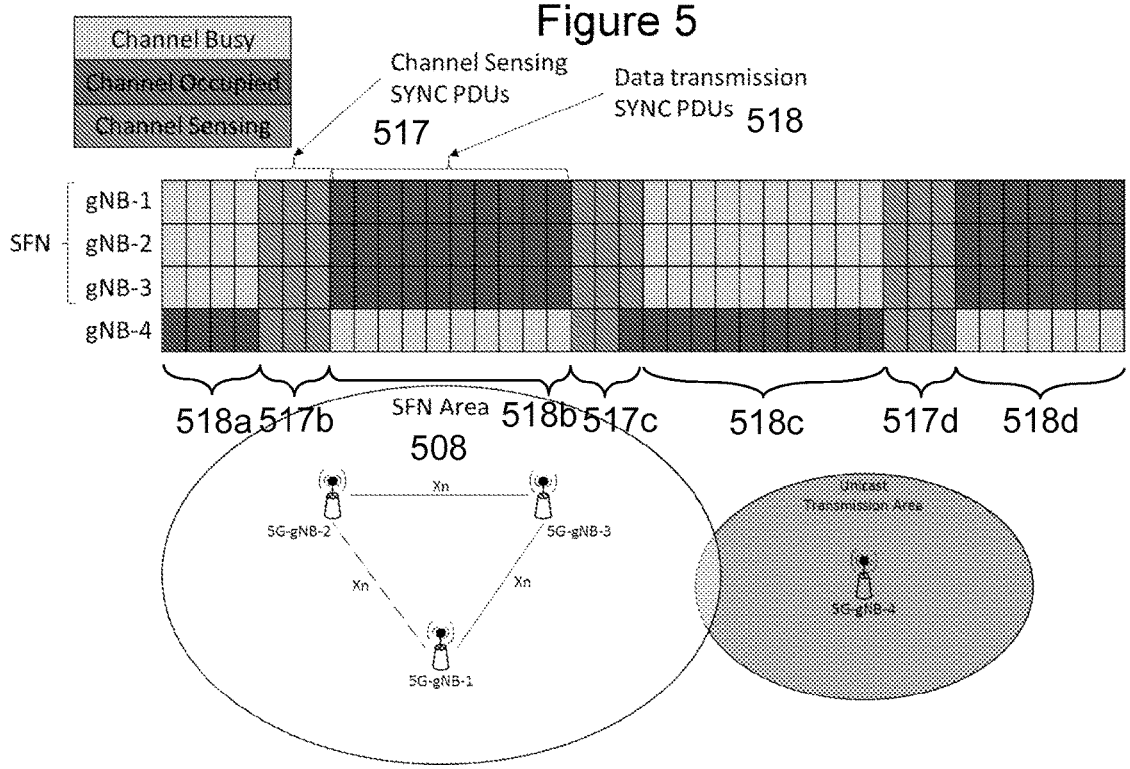
FIG. 5 shows the operation of a plurality of base stations experiencing interference from an external transmitter.

FIG. 5 shows the operation of a plurality of base stations gNB-1-3 forming a MBSFN when there is interference from an external transmitter gNB-4 that does not form part of the MBSFN. The external transmitter gNB-4 operates independently of the MBSFN using its own set of unicast transmissions. In this example, the network element is configured to allocate a plurality of sequential transmission periods 518 and a plurality of sequential sensing periods 517 to each of the plurality of base stations gNB-1-3. Furthermore, each base station gNB-1-3 is configured to independently determine, during the allocated sensing periods 517, whether the unlicensed frequency resources are available for transmission, and transmit the data packets during the allocated transmission periods 518 if the unlicensed frequency resources are determined to be available. The plurality of transmission periods 518 and the plurality of sensing periods 517 are equally spaced from one another according to a predefined pattern, and may be defined in terms of time and/or frames.

As can be seen from FIG. 5, the base stations gNB-1-3 on this occasion detected (during a first sensing period which is not shown) that the external transmitter gNB-4 was occupying the unlicensed frequency resources and therefore did not proceed with their respective transmissions in the first transmission period 518a. During the second sensing period 517b, however, the base stations gNB-1-3 determined that the unlicensed frequency resources had become available and therefore proceeded with their respective transmissions in the second transmission period 518b. During the third sensing period 517c, each base station again detected interference from the external transmitter gNB-4 and consequently delayed transmission until the next transmission period that the unlicensed frequency resources were available (in this case, the fourth transmission period 518d for all base stations gNB-1-3 rather than the occupied third transmission period 518c).

Figure 6:
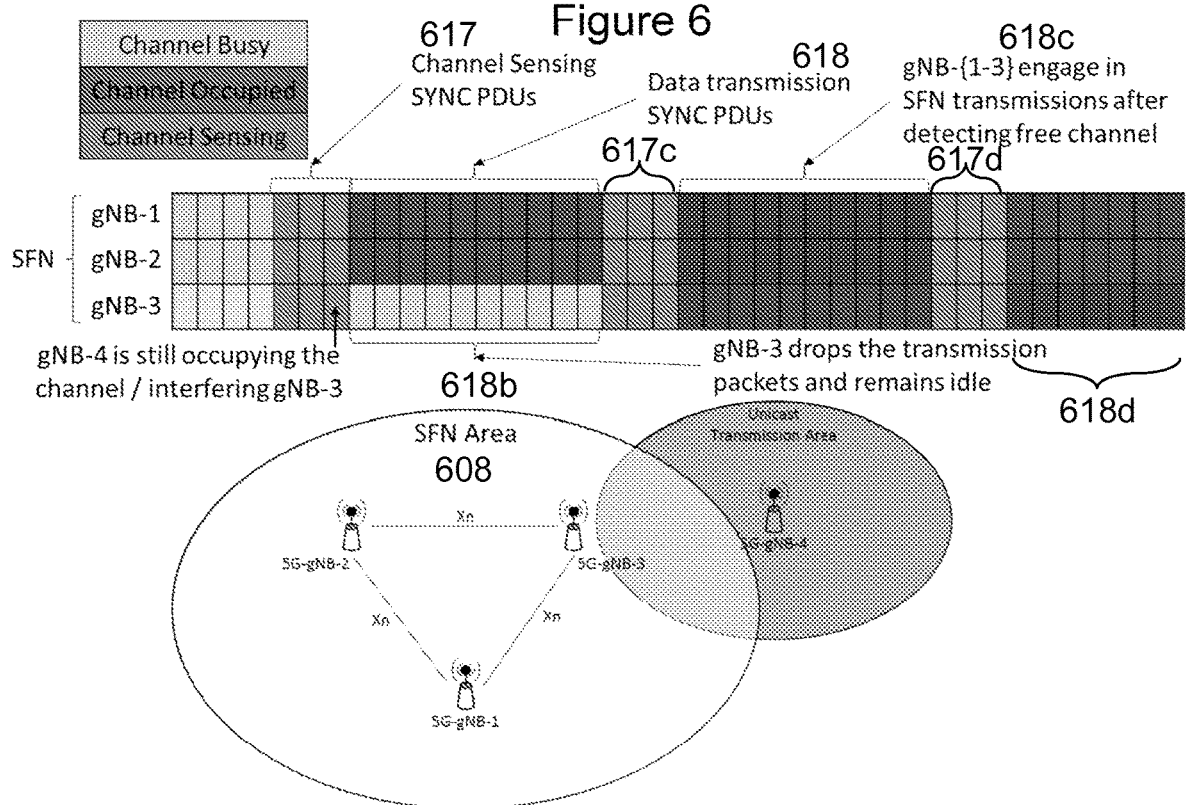
FIG. 6 shows the further operation of a plurality of base stations experiencing interference from an external transmitter.

FIG. 6 shows another scenario using the same MBSFN 608 as FIG. 5. This time, the third base station gNB-3 continued to detect interference from the external transmitter gNB-4 during the second sensing period 618b which was not detected by the first gNB-1 and second gNB-2 base stations.

As such, rather than all base stations gNB-1-3 delaying transmission, the first gNB-1 and second gNB-2 base stations proceeded with their respective transmissions in the second transmission period 618*b* whilst the third base station gNB-3 discarded/dropped the data packets. This approach ensures that the data packets are sent as soon as possible, although there could be a decrease in transmission coverage and/or transmission capacity by virtue of a reduced number of transmitting base stations. No interference from the external transmitter gNB-4 was detected by any of the base stations gNB-1-3 during the third 617*c* or fourth 617*d* sensing periods. As a result, all three base stations gNB-1-3 were able to proceed with their respective transmissions during the third 618*c* and fourth 618*d* transmission periods as scheduled.

In some cases, each base station may be configured to inform the network element about the unavailability of the unlicensed frequency resources. In this situation, the network element may be configured to allocate a sub-period of the current transmission period for the base station to determine whether the unlicensed frequency resources have become available (i.e. as an interim sensing period). The base station is then configured to transmit the data packet using the unlicensed frequency resources before expiry of the current transmission period if it is determined during the allocated sub-period that the unlicensed frequency resources have become available. This option maximises the number of transmitting base stations within a given transmission period by forcing any detected interference to be reassessed before the transmission period expires. In effect, this helps to reduce the delay in transmission and increases the transmission coverage and capacity of the MBSFN.

Alternatively, the network element may be configured to determine whether one or more of the transmission coverage and transmission capacity of the MBSFN without the non-transmitting base stations has decreased below a predefined threshold, and adapt the transmission parameters of at least one of the transmitting base stations to compensate for any decrease in transmission coverage and/or transmission capacity. On some occasions, however, the number of non-transmitting base stations may be sufficiently large that it is not possible to fully compensate for the resulting decrease in transmission coverage and/or transmission capacity. In this scenario, the network element may be configured to allocate an alternative transmission period to at least the non-transmitting base stations (although any base stations that have already transmitted the data packets may be configured to retransmit them during the alternative transmission period). This alternative transmission period may occur earlier than the next transmission period initially allocated to reduce any delay in transmission.

Although the sensing periods in the examples of FIGS. 5 and 6 have been specifically allocated to the plurality of base stations by the network element, default sensing periods could be used instead. For instance, the sensing periods could be any time other than the allocated transmission periods, or each sensing period could begin after a predefined delay following expiry of a respective transmission period.

Allocation of the transmission (and in some cases, the sensing periods) to the plurality of base stations by the network element could be implemented in a number of different ways. For example, the transmission and sensing periods may be allocated using time stamp marking, frame types or header extensions in a plurality of respective data packets (e.g. the data packets to be transmitted). Regarding frame types, the transmission periods may be allocated using first frame types which contain payload information, and the plurality of sensing periods may be allocated using second frame types which do not contain payload information.

Figure 7:
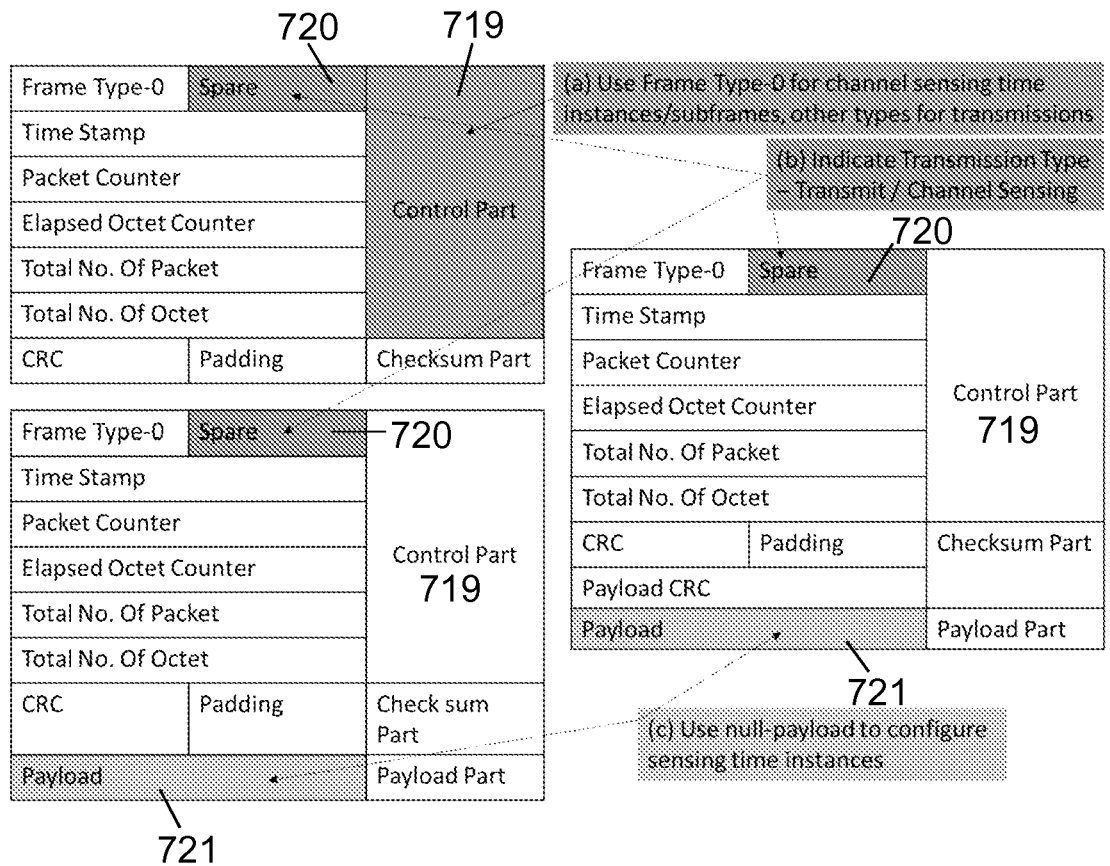
FIG. 7 shows the use of SYNC protocol enhancements to allocate transmission and sensing periods to a plurality of base stations.

FIG. 7 shows how various enhancements in the SYNC protocol could be used to allocate the transmission and sensing periods. One option is to use the Frame Type-0 (719), which does not contain payload information, for the sensing periods. Other frame types which contain payload information to be scheduled over the air could then be used for the transmission periods. Here it is implicitly expected that the base stations would simply discard/drop the data packets for those transmission periods when they are unable to transmit, although they could wait until a later transmission period to reinitiate transmissions. The former would enable complete synchronization between the base stations without any coordination between them, while complying with the contention-based protocols.

Another option is to use "spare" bits 720 within the SYNC Protocol Data Units (PDUs) to explicitly indicate whether the PDU is meant for transmission or sensing. This enables an efficient means of instructing the base stations to engage in sensing and transmission in a synchronized manner. Yet another option is to use null PDUs for type-1/2 (721) to indicate the sensing periods, and transmit actual PDUs during other time periods. In this way, the base stations are configured to engage in sensing based on the payload information within the SYNC PDUs. This also enables the base stations to pre-plan the transmission pattern immediately after receiving the SYNC PDUs. In case some PDUs are lost within the transport network, the base stations could be configured to engage only in sensing during those time periods, or reconstruct the operational paradigms based on the received PDUs for the preceding and succeeding time periods.

The system described herein may also use any extensions in Internet Protocol (IP) packet headers within the mobile network to allocate the transmission and sensing periods. Possible extensions of GTP using plane packet headers, 5G Quality of Service Flow Identity extensions, or any other protocol data unit enhancements are suitable for this purpose.

The system described herein may further comprise a user device configured to receive the transmitted data packets from the base stations. In some cases, the user device may also be configured to assist with the operation of the MBSFN. For example, the user device may be configured to measure the transmitting power of an external transmitter which does not form part of the MBSFN, and inform one or more of the network element and a base station of the MBSFN about the external transmitter. On receipt of this information, the network element or base station may then share the information with the other base stations (e.g. using beam-level communications rather than cell-level communications). This feature may enable the base stations to detect the external transmitter (and therefore comply with contention-based protocols) even if they have not yet been allocated a sensing period or are unable to perform sensing at that time (e.g. because of damage to their respective receivers).

The user device may be configured to inform one or more of the network element or base station about the external transmitter only if the transmitting power of the external transmitter exceeds a predefined threshold. Furthermore, the user device may be configured to measure the transmitting power of the external transmitter only during the allocated transmission periods allocated to the base stations.

Figure 8:
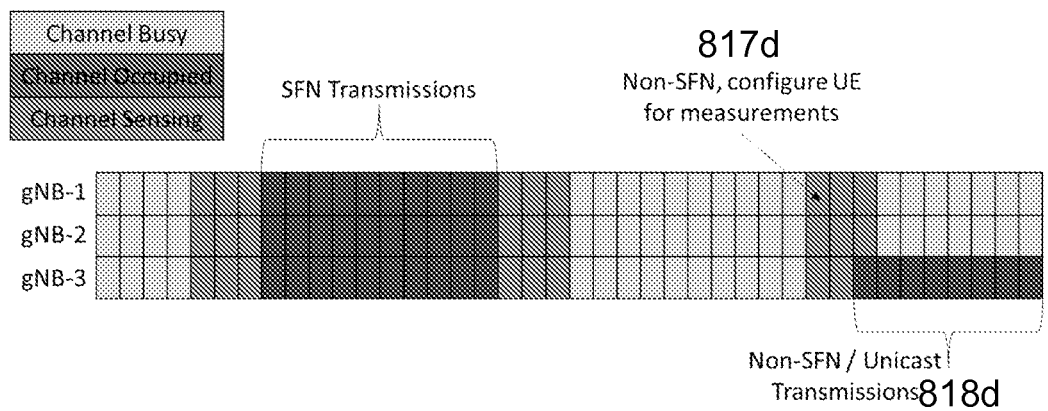
FIG. 8 shows the use of an alternative transmission mode by one of the base stations when interference from an external transmitter is detected.

FIG. 8 shows another option which may be adopted when an external transmitter is determined to be interfering with the transmissions of one of the base stations of the MBSFN. In this example, the first gNB-1 and second gNB-2 base stations detected no interference during one of the sensing periods 817d, but the third base station gNB-3 did (as per the scenario in FIG. 6). As a result, only the first gNB-1 and second gNB-2 base stations continued with their respective (SFN) transmissions during the next allocated transmission period 818d using the unlicensed frequency resources. Rather than discarding/dropping the data packets or delaying transmission, however, the third base station gNB-1 transmitted the data packets using an alternative transmission mode (i.e. non-SFN). The ability to use alternative transmission modes allows the base stations gNB-1-3 to switch seamlessly between unicast, multicast or broadcast transmissions to ensure that the data packets are sent during the allocated time periods.

Figure 9:
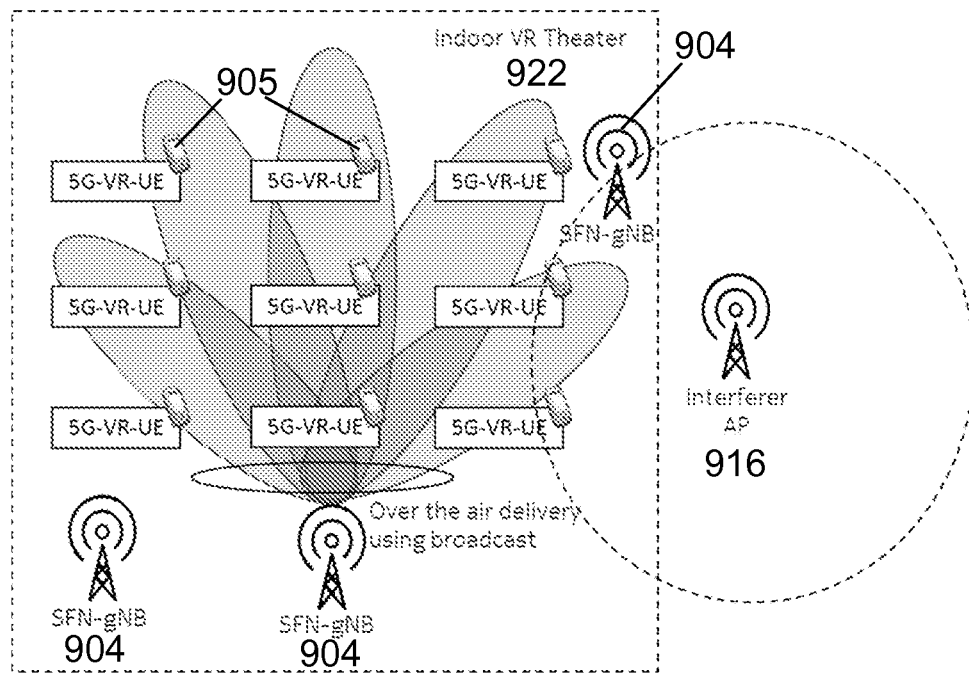
FIG. 9 shows an example scenario for evaluating the effectiveness of the method described herein.

FIG. 9 shows an example scenario for evaluating the effectiveness of the method described herein. Here, the plurality of base stations 904 of the MBSFN 908 are deployed inside a VR theatre 922 to transmit multicast broadcast content to a plurality of user devices 905. However, an interfering external transmitter 916 in the form of a WiFi™ access point within a neighbouring coffee shop is operating using the same unlicensed frequency resources as the MBSFN 908. The MBSFN 908 is assumed to operate in the 60 GHz unlicensed frequency band with 1 GHz of system bandwidth. The MBSFN 908 is also assumed to comprise five base stations 904, one or two of which are currently unable to transmit due to contention-based protocols. For the non-transmitting base stations, the data packets are discarded/dropped during the transmission periods affected by the interference from the external transmitter 916 (as described with reference to FIG. 6). To evaluate the effectiveness of the present method, the received signal-to-interference and noise ratio (SINR) and user throughput of the users within the indoor VR theatre 922 were simulated.

Figure 10:
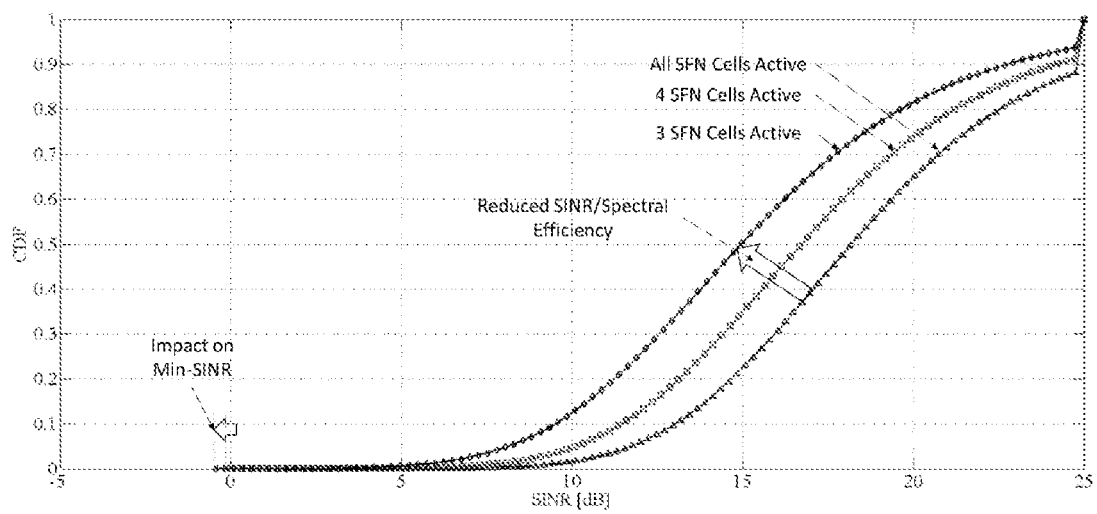
FIG. 10 shows a variation in signal-to-interference and noise ratio with differing numbers of transmitting base stations.
Figure 11:
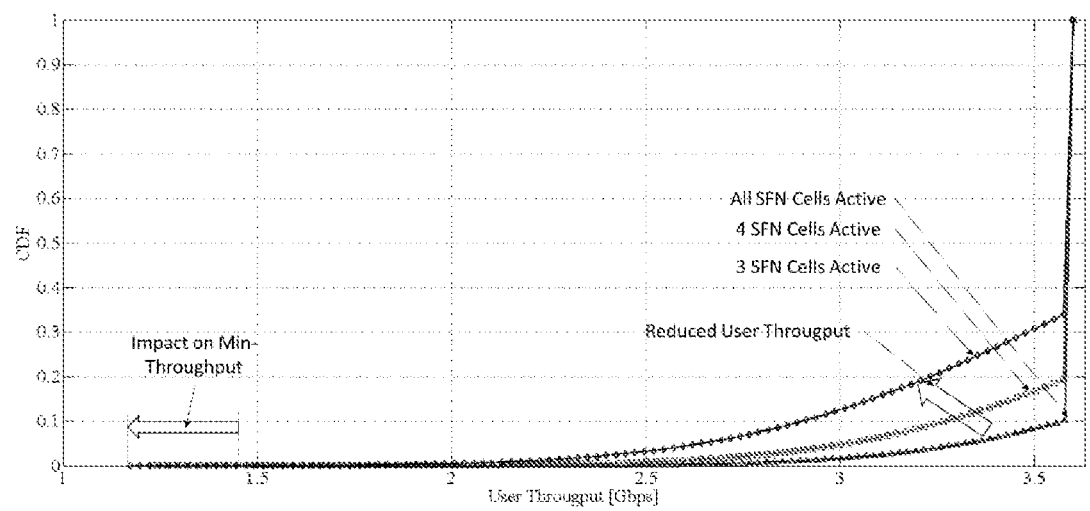
FIG. 11 shows a variation in user throughput with differing numbers of transmitting base stations.

FIGS. 10 and 11 show the simulated SINR and user throughput, respectively. From these figures, there can be seen to be a minimal impact on the spectral efficiency and throughput for the worst affected user. This could be addressed, however, by redistributing the base stations around the theatre to reduce interference from the external transmitter and/or adapting the transmission parameters of the unaffected/transmitting base stations to compensate for the loss in spectral efficiency and throughput.

Figure 12:
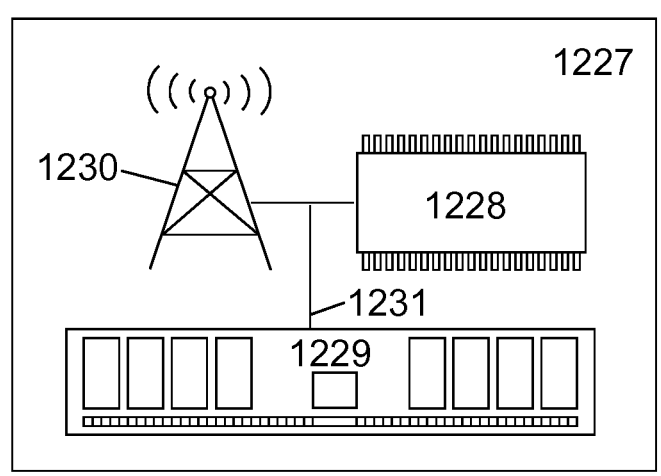
FIG. 12 shows an apparatus forming part of the system described herein.

FIG. 12 shows an apparatus 1227 forming part of the system described herein. The apparatus 1227 may form at least part of one of the base stations of the MBSFN, the network element or one of the user devices. The apparatus 1227 comprises a processor 1228 and memory 1229 (including computer program code) and a transceiver 1230, which are electrically connected to one another by a data bus 1231.

The processor 1228 may be configured for general operation of the apparatus 1227 by providing signalling to, and receiving signalling from, the other components to manage their operation. The memory 1229 may be configured to store computer code configured to perform, control or enable operation of the apparatus 1227. The memory 1229 may also be configured to store settings for the other components. The processor 1228 may access the memory 1229 to retrieve the component settings in order to manage the operation of the other components. The transceiver 1230 may comprise a separate transmitter and receiver and is configured to transmit data to, and receive data from, one or more other devices via a wired and/or wireless connection.

For example, if the apparatus 1228 forms part of a base station, the transceiver 1230 may be configured to receive a transmission period allocated by the network element, and transmit a data packet to a user device if the unlicensed frequency resources are determined to be available. Furthermore, the allocated transmission period may be stored in the memory 1229, and determination of whether the unlicensed frequency resources are available for transmission may be performed by the processor 1228.

Figure 13:
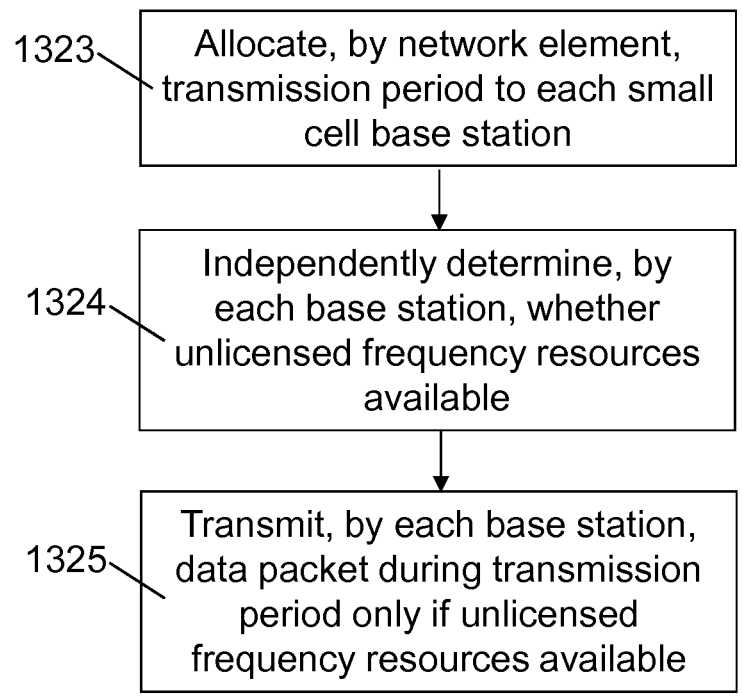
FIG. 13 shows a method of using the system described herein.

FIG. 13 shows the main steps 1323-1325 of the method described herein. The method generally comprises: allocating, by a network element, a transmission period to each of a plurality of base stations forming a multicast broadcast single frequency network operating using unlicensed frequency resources 1323; independently determining, by each base station, whether the unlicensed frequency resources are available for transmission 1324; and transmitting, by each base station, a data packet using the unlicensed frequency resources during the allocated transmission period only if the unlicensed frequency resources are determined to be available 1325.

Figure 14:
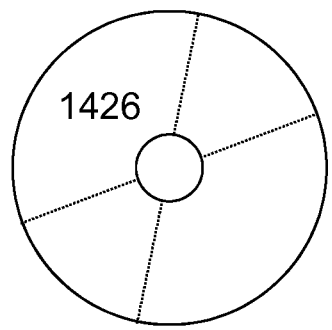
FIG. 14 shows a computer-readable medium comprising a computer program configured to perform, control or enable the method of FIG. 13.

FIG. 14 shows a computer/processor readable medium 1426 providing a computer program. The computer program may comprise computer code configured to perform, control or enable one or more of the method steps 1323-1325 of FIG. 13 using at least part of the system described herein. In this example, the computer/processor readable medium 1426 is a disc such as a digital versatile disc (DVD) or a compact disc (CD). In other embodiments, the computer/processor readable medium 1426 may be any medium that has been programmed in such a way as to carry out an inventive function. The computer/processor readable medium 1426 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A system comprising:
a plurality of base stations forming a multicast broadcast single frequency network operating using unlicensed frequency resources; and
a network element configured to allocate a transmission period to each of the plurality of base stations, wherein:
each base station is configured to:
independently determine whether the unlicensed frequency resources are available for transmission, and transmit a data packet using the unlicensed frequency resources during the allocated transmission period only if the unlicensed frequency resources are determined to be available, and
inform the network element about the unavailability of the unlicensed frequency resources if the unlicensed frequency resources are determined by the base station to be unavailable for transmission,
the network element is configured to allocate a sub-period of the allocated transmission period for the base station to determine whether the unlicensed frequency resources have become available, and
the base station is configured to transmit the data packet using the unlicensed frequency resources before expiry of the allocated transmission period if it is determined that the unlicensed frequency resources have become available,
wherein each base station is configured to discard the data packet if the unlicensed frequency resources are determined by the base station to be unavailable for transmission.

2. The system of claim 1, wherein each base station is configured to delay transmission of the data packet until the unlicensed frequency resources become available if the unlicensed frequency resources are determined by the base station to be unavailable for transmission.

3. The system of claim 2, wherein the network element is configured to allocate a plurality of sequential transmission periods to each of the plurality of base stations, and wherein the base station is configured to delay transmission of the data packet until the next allocated transmission period at which the unlicensed frequency resources are available.

4. The system of claim 1, wherein the network element is configured to determine whether one or more of the transmission coverage and transmission capacity of the single frequency network without the base station has decreased below a predefined threshold, and adapt the transmission parameters of at least one of the other base stations to compensate for the decrease in transmission coverage and/or transmission capacity.

5. The system of claim 1, wherein if the unlicensed frequency resources are determined by more than a predefined number of base stations to be unavailable for transmission, the network element is configured to allocate an alternative transmission period to at least those base stations.

6. The system of claim 5, wherein the network element is configured to initially allocate a plurality of sequential transmission periods to each of the plurality of base stations, and wherein the alternative transmission period occurs earlier than the next transmission period initially allocated.

7. The system of claim 5, wherein any base stations that have already transmitted the data packet are configured to retransmit the data packet during the alternative transmission period.

8. The system of claim 1, wherein each base station is configured to independently determine, during a sensing period, whether the unlicensed frequency resources are available for transmission.

9. The system of claim 8, wherein the sensing period is any time other than an allocated transmission period.

10. The system of claim 1, wherein the system further comprises a user device configured to receive the transmitted data packets from the base stations.

11. The system of claim 10, wherein the user device is configured to measure the transmitting power of a transmitter which does not form part of the single frequency network, and inform one or more of the network element and a base station of the single frequency network about the transmitter.

12. Apparatus comprising a transceiver and at least one processor and at least one memory including computer program code which, when executed by the at least one processor, causes the apparatus to:
form one of a plurality of base stations forming a multicast single frequency network operation using unlicensed frequencies resources to allocate a transmission period to each of the plurality of base stations, wherein:
each base station is configured to:
independently activate its receiver side of the transceiver to determine whether the unlicensed frequency resources are available for transmission, and transmit a data packet using the unlicensed frequency resources during the allocated transmission period only if the unlicensed frequency resources are determined to be available, and
inform a network element about the unavailability of the unlicensed frequency resources if the unlicensed frequency resources are determined by the base station to be unavailable for transmission,
the network element is configured to allocate a sub-period of the allocated transmission period for the base station to determine whether the unlicensed frequency resources have become available, and
the base station is configured to activate its transmitter side of the transceiver and to transmit the data packet using the unlicensed frequency resources before the expiry of the allocated transition period if it is determined that the unlicensed frequency resources have become available,
wherein each base station is configured to discard the data packet received if the unlicensed frequency resources are determined by the base station to be unavailable for transmission.

13. The apparatus of claim 12, wherein each base station is configured to delay transmission of a packet until the unlicensed frequency resources become available if the unlicensed frequency resources are determined by the base station to be unavailable for transmission.

14. The apparatus of claim 13, wherein the network element is configured to allocate a plurality of sequential transmission periods to each of the plurality of the base stations, and wherein the base station is configured to delay transmission of the data packet until the next allocated transmission period at which the unlicensed frequency resources are available.

15. The apparatus of claim 12, wherein the network element is configured to determine whether one or more of the transmissions coverage and transmissions capacity of a single frequency network without a base station has decreased below a predetermined threshold, and adapt the transmission parameters of at least one of the other base stations to compensate for the decrease in transmission coverage and/or transmission capacity.

16. The apparatus of claim 12, wherein each base station is configured to independently determine, during a sensing period, whether the unlicensed frequency resources are available for transmission.

17. The apparatus of claim 12, wherein the network element comprises one or more of a broadcast multicast service centre, and a multi cast coordination entity as one entity or individual entities along with at least one of the base stations.

18. The apparatus of claim 17, wherein the apparatus further comprises an apparatus in the form of a user device configured to receive the transmitted data from the base station.

19. The apparatus of claim 18, wherein the user device is configured to measure the transmitting power of a transmitter which does not form part of the single frequency network, and inform one or more of the network elements and the base station of the single frequency network about the transmitter.

20. The apparatus of claim 18, wherein the single frequency network is a vertical micro-operator network.

\* \* \* \* \*